United States Patent
Watkins

[15] 3,659,455
[45] May 2, 1972

[54] POWER STOPPER
[72] Inventor: Billy K. Watkins, RR 01, Lovington, Ill. 61937
[22] Filed: Jan. 23, 1970
[21] Appl. No.: 5,322

Related U.S. Application Data
[63] Continuation-in-part of Ser. No. 723,772, Apr. 24, 1968, Pat. No. 3,491,590.

[52] U.S. Cl. .........................................................73/141 R
[51] Int. Cl. .........................................................G01l 5/13
[58] Field of Search .....................................73/133, 141, 146

[56] References Cited

UNITED STATES PATENTS

| | | | |
|---|---|---|---|
| 1,592,182 | 7/1926 | Davidson et al. | 73/133 |
| 1,603,521 | 10/1926 | Davidson et al. | 73/141 |

Primary Examiner—Charles A. Ruehl
Attorney—Hill, Sherman, Meroni, Gross & Simpson

[57] ABSTRACT

Increasing frictional resistance to forward movement is provided by a self-propelled power stopper weight transfer apparatus comprising a four-wheeled vehicle chassis on which there is positioned an elongated mass guide upon which a gear-driven mass of up to ten tons may be moved from a position over a rearward, relatively frictionless means to a forward position over a high friction sled means. A motor power means at the front end of the vehicle chassis not only allows the apparatus to be driven on a highway and acts as a return means during a contest, but also eliminates the need for a separate dead weight on the sled means. Movement of the mass on the mass guide is produced by a direct gear drive connected in the power transmission system. A cab which may be provided on the chassis also adds dead weight. A fifth wheel arrangement on the sled, the attachment of which to the chassis may be controlled from the cab, allows rapid coupling and uncoupling of the apparatus and the sled means for simple, quick and efficient operation.

14 Claims, 2 Drawing Figures

PATENTED MAY 2 1972

3,659,455

INVENTOR.
Billy K. Watkins
BY Hill, Sherman, Meroni, Gross & Simpson
ATTORNEYS 3,659,455

POWER STOPPER

BACKGROUND OF THE INVENTION

This is a continuation-in-part of my co-pending application Ser. No. 723,722, filed Apr. 24, 1968, and issued on Jan. 27, 1970, as U.S. Pat. No. 3,491,590.

This invention generally relates to a measuring and testing apparatus, and more particularly contemplates what may be generally designated as a dynamometer for measuring pull. Specifically, my improvement relates to a power weight stopper apparatus which is alternately self-propelled for transportation between pulling meets and for movement of itself and an attached sled means during a contest.

As described in my co-pending application, the crude and inconsistent means for measuring and comparing the pulling energy of tractors was replaced by the simple, accurate and reliable power stopper of my invention.

Thus, my prior invention provided a device for indicating the relative pulling force exerted by a power source comprising a sled adapted to be connected to and moved by the power source, and a weight transfer apparatus having a front portion supported by a ground engaging sled and a rear portion supported by means which allow relatively friction free movement of the apparatus. The weight transfer apparatus embodies an elongated weight mass guide extending along the weight transfer apparatus and supporting thereon a relatively movable mass which may be moved therealong a distance proportional to the distance through which the device is pulled by a mass moving means. As the weight moves from a position over the rearward relatively friction-free ground engaging means to a position where its center of gravity is near the high friction ground engaging means at the forward end the friction force on the sled increases thereby slowing or actually stopping the pulling apparatus. In practice an additional dead weight almost always was present on the sled to provide an initial stability and friction force. Upon the completion of a pull, which may be as much as 200 to 300 feet or more, depending on the course, a separate tractor or pulling apparatus attached itself to the power stopper and the sled to return them to their initial starting positions for the next contestant. To move the apparatus cross country from one tractor pulling meet to another required that the device be carefully loaded on another transporting means, moved cross country and then be carefully unloaded.

SUMMARY OF THE INVENTION

The instant invention is directed to improvements on my basic invention and thus it will be understood that this invention carries forward my prior invention and adds thereto a further invention. Thus, I have discovered that by adding a motor power means and steerable front wheels to the forward end of an apparatus according to my prior invention I can not only propel the apparatus over roads and highways in substantially the same condition as it is when used during a contest to thereby eliminate a separate hauling vehicle with the accompanying loading and unloading time, but in addition, the motor power means connected through a transmission system with the rear wheels would allow my apparatus to be self propelled and return itself to its initial starting position after each contestant has finished thereby eliminating the personnel and equipment which ordinarily had to stand-by to accomplish the same result.

Another advantageous result accomplished by my present invention is that the placement of the motor power means, front wheel means and cab structure at the forward end of my apparatus provides a large enough weight so that the heretofore required dead weight means on the sled such as illustrated by the tractor in my prior application, may now be eliminated.

Having provided a power transmission means driving the apparatus through the rear wheel means, I have found it advantageous to employ a gear drive weight mass moving embodiment of my prior invention. It will be understood that the gear drive weight mass moving concept set forth herein was within the contemplation of my prior invention and does not form a part of the present invention except insofar as it relates to the new and advantageous combination of this invention.

A specific embodiment of my invention herein includes a stable movable chassis or transporting under carriage having relatively friction free front and rear wheel means. Each wheel means may comprise a pair of wheels on an axle. The front wheel means must be steerable to allow movement of the apparatus over roads and highways. A cab mounted on the forward end of the chassis contains a seat and steering wheel means. A main support or mass guide extends from behind the cab along the chassis past the rear wheel means. A weight receiving trolley which may be shorter than it is wide rides on the main support and is moved therealong in direct relationship to the movement of the entire apparatus by a suitable weight moving means which may advantageously take the form of a rotatable geared drive shaft connected to and driven by the rear wheels of the transporting under carriage. Thus, as the rear wheel means on the under carriage turn during the forward movement of the apparatus, they drive the rotatable geared drive shaft. Since it is important that the rear wheels rotate easily during the movement of the apparatus over the pulling course, the drive system for the weight trolley may be geared down.

A motive power source which may be positioned at the front end under the cab is connected to the rear wheel means by a suitable motive power transmission system so that when the weight drive system is disconnected from the rear wheels the motive power drive system may be connected thereto to move the apparatus to its initial starting position and also to drive the apparatus over roads and highways between various locations of use.

Another important feature of my invention is the provision of a fifth wheel means on the sled along with inclined positioning blocks so that the weight transfer apparatus may be easily moved onto and off of the ground engaging sled. Thus, when the weight transfer apparatus is to be moved onto the sled the front wheels move up the positioning blocks and off of the end to position the front end of the weight transfer apparatus on the fifth wheel and engage a kingpin on the fifth wheel with the underside of the front end of the weight transfer apparatus. Provision of the fifth wheel allows an articulated connection between the sled and the weight transfer apparatus so that the combination may snake over the source of pull. When it is desired to remove the weight transfer apparatus from the sled the motive power source is engaged with the rear wheels and is pulled up over the end of the positioning block and of off the sled. A chain connected to the forward end of the weight transfer apparatus and the rear end of the sled allows the weight transfer apparatus under its motive power to pull the sled back with it to the exact starting line and then the weight transfer apparatus is driven back onto the sled for the next contestant.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which.

DESCRIPTION OF THE PREFERRED EMBODIMENT

Figures 1, 2:
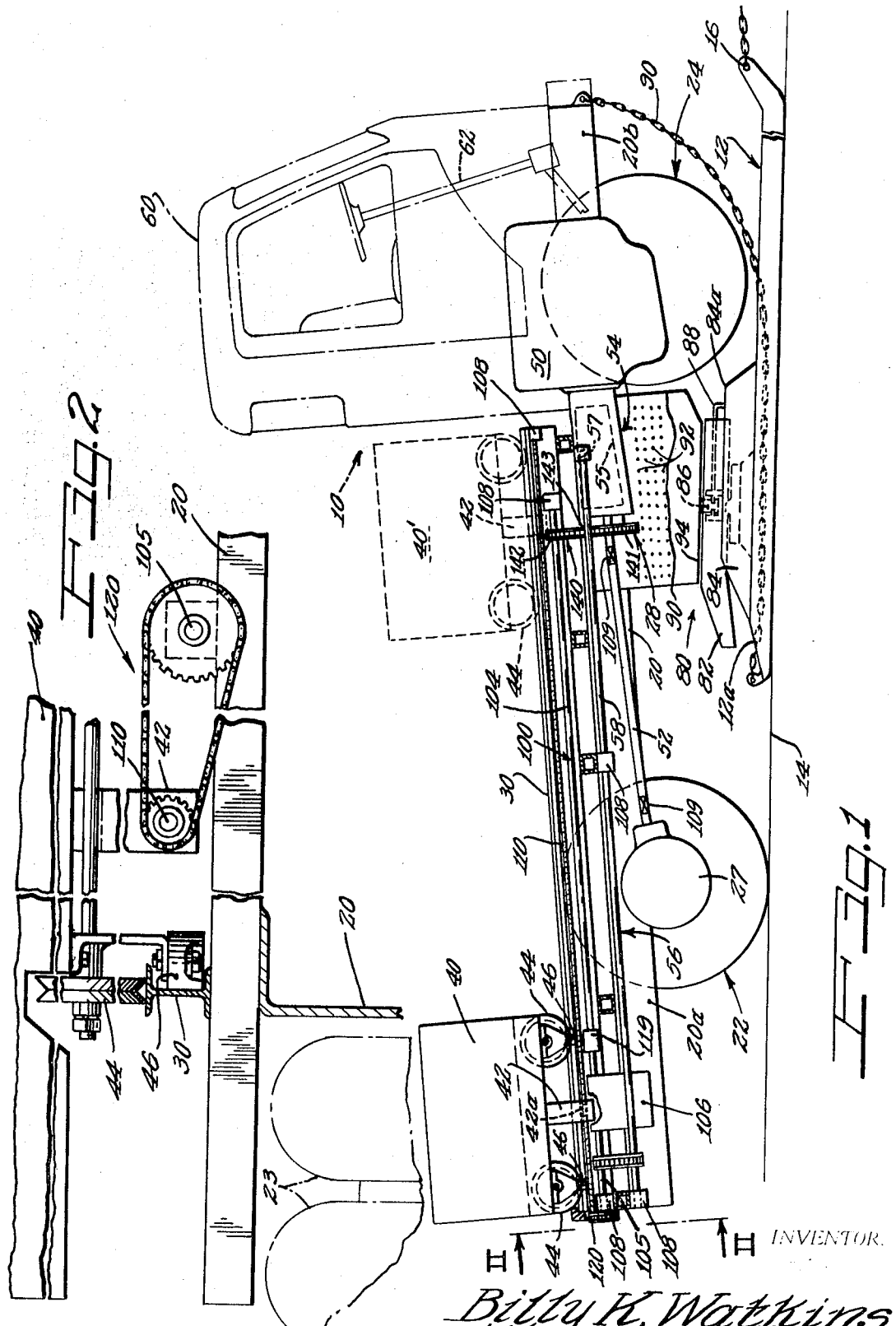
FIG. 1 is an elevational view with parts in cross-section of an improved apparatus according to my invention and, FIG. 2 is a cross-sectional view taken along the lines II—II in FIG. 1 showing the relation of the weight to the chassis.

There is shown in FIG. 1 a self propellable means in the form of a power stopper weight transfer apparatus generally indicated at 10 mounted in position on a frictional resistance means such as shown by the sled 12 which engages the ground 14. The sled 12 has a hitch means 16 at its forward end to which there will be attached the device whose power output is to be measured by the combination of the weight transfer apparatus 10 and the sled 12.

The self propellable means 10 includes an elongated chassis or under-carriage 20 which is supported at its first or rearward end 20a by a first wheel means 22 and which is supported at its second or forward end 20b by a second wheel means 24. A main support means or mass guide 30 may be mounted on or integral with the chassis 20. A weight mass 40 is supported by said mass guide 30 for movement therealong.

A motive power means 50 is supported by the chassis 20 at its forward end. A cab 60 may be mounted over said motive power means on the front end of the chassis 20b. The motive power means 50 may be of a conventional internal combustion design although any suitable means is contemplated. Likewise, the cab 60 may be of a conventional design and includes therein a steering mechanism generally indicated at 62 which allows steering of the front wheel means 24 from the cab 60. In this form the weight transfer apparatus 10 may be driven by the motive power means 50 over highways or to return itself to a starting position after having been pulled by a contestant in a tractor pulling contest. An attachment means 80 allows the forward end of the weight transfer apparatus 10 to be positively and pivotally attached to the ground engaging sled 12 so that when the apparatus whose force is to be measured is attached to the sled at 16 and pulls the sled 12 and the connected weight transfer apparatus 10 forward, the weight means 40 will be moved forwardly by suitable weight movement means generally indicated at 100 through a distance which is proportional to the distance that the weight transfer apparatus and attached sled are moved. The measurement of the distance through which each competing tractor moves the weight transfer apparatus or the time in which each competing tractor moves the apparatus over a course of a fixed distance will determine the relative power of the competing tractors.

According to my instant invention the addition of the motive power means 50 to the forward end 20b of the chassis 20 and its connection to the first wheel means 22 with a first drive shaft means generally indicated at 52 allows the self propellable weight transfer apparatus 10 to propel itself as a normal vehicle over highways and allows it to return itself from its final pull position to its initial starting position after each pull. In addition, the weight of the motive power means 50, the second wheel means 24, the cab means 60 and the attachment means 80 provides a dead weight that is transferred to the sled 12 and replaces the extra dead weight heretofore required.

The first wheel means 22 may advantageously take the form as shown in FIG. 2 of pairs of wheels mounted on opposite sides of an axle structure having a single speed differential means 27.

A first drive shaft 52 is connected at its rearward end to the differential means 27 and has a first gear means generally indicated at 28 connected to its forward end. A second gear means generally indicated at 54 in turn is connected between the first gear means 28 and the motive power source 50. With this arrangement the first wheel means 22 may be driven by the power source 50 to move the apparatus 10 forward or rearward on its wheel means 22, 24 by power transmitted through an engaged second gear means 54, a disengaged first gear means 28 and the first drive shaft 52. The second gear means 54 may be of a structure and function much like a conventional automotive transmission to allow the transmission of power from the motive power means 50 at different rates of speed. Accordingly, this structure will be understood by those skilled in that art and need not be set forth in detail.

During movement of the self propellable means 10 when it is mounted on the sled 12 the rotation of the wheel means 22 is transmitted by the differential means 27 through the first drive shaft 52, through an engaged first gear means 28 to a weight movement means 100 whereby the weight 40 moves in response to movement of the apparatus. The second gear means 54 will at this time be disengaged from the first gear means 28. It will be understood by those skilled in the art that the engagement and disengagement of the first and second gear means may be by conventional means such as clutches which are operable in a conventional manner from the cab. In the embodiment shown I have included a schematically illustrated clutch means 55 in the second gear means 54 and provide a clutch means 119 in the weight movement means 100.

The first gear means 28 as schematically shown in FIG. 1 may transmit power to the weight movement means 100 through a first chain drive means 140 including a sprocket 141 mounted on the first drive shaft 52, a sprocket 142 mounted on a second drive shaft 104 and chain 143 thereabout. In this arrangement I have found a 2:1 sprocket ratio and a number 60 roller chain of ⅝ pitch to provide excellent results.

Inasmuch as the first wheel means 22 has a gear means to allow it to be driven by the motive power means 50 I have found it advantageous to provide a direct drive geared weight movement drive system 100. In this geared weight drive system 100 the rotary power of the wheels is transmitted through the differential 27 to the first gear means 28, thence through the power output gear means 140, to the second drive shaft 104, through a clutch means 119, through a third gear means 106, through a third drive shaft 105 and through a second chain drive means 120 to a fourth drive shaft 110 which in turn moves the weight 40. The fourth drive shaft 110 may advantageously be centrally positioned on the chassis 20 and extended through an opening 42 in a central portion 40a of the weight means 40 that depends between the guide support means 30. A suitable mating gear engaging means 42a is affixed to the interior of the opening 42 and engages the threaded shaft 110 so that rotation of the shaft 110 will move the weight means 40 along the supporting mass guide 30. Rotation of the shaft 110 in a first direction moves the mass 40 forward while rotation in a second direction moves the mass 40 rearwardly.

The third gear means 106 allows a final speed control of the "Acme" gear shaft 110 and may include various gear ratios to provide a generally equal course of travel regardless of the class of tractor pulling the apparatus. An excellent range is provided by a four speed gear means having ratios of 1:1, .8125:1, 6.25:1, and .4,063:1. The third gear shift means may be directly on the gear box since it will be changed only for different classes. This also has the advantage that the confidence of the participants in the integrity of the apparatus is increased when all variable controls and their actuators are clearly displayed. Since the chain drive means 140 and 120 are clearly visible and when the differential 27 is of a single speed type no change in ratios can be made hence the third gear means 106 may be the only effectively "hidden" variable and thus its control should be visible. A differential 27 of a multi-speed type may in some respects provide some of the advantages of the third gear means 106, however, in view of the use of the differential 27 for cross country driving as well I have found that arrangement not entirely satisfactory. Moreover, with the third gear means in position as shown the weight return is facilitated as will hereinafter be made clear.

To reduce the friction between the guide 30 and the mass 40 there may be provided suitable wheel means 44 between the guide 30 and the weight mass 40. When the weight mass guide 30 takes the form of "I" beams such as shown for example in FIG. 2, further wheeled guide means such as shown at 46 may be provided below the upper flange to space the mass and to lock the mass in place against upward movement. The relatively frictionless guide means 44, 46 may be spaced along the length of the weight 40 to prevent binding of the weight during its movement along the guide means 30. The guide means 30 may have its upward surface configured in an upwardly pointed shape as shown and the wheels 44 may be of mating engagement therewith to increase lateral stability of the weight means 40 on the guide 30. In addition suitable guide rail support means 32 may be provided to connect the guide 30 to the chassis means 20.

As heretofore stated, forward movement of the mass 40 from a position as shown in solid lines at 40 to a forward position such as shown for example at 40' in dotted lines results when the wheel means 22 rotate in response to forward movement of the apparatus 10 and the rotational movement is transmitted through the weight movement drive system 100 to turn the shaft 110 in a first direction.

Return of the weight mass from a position such as shown at 40' to the initial starting position illustrated at 40 is easily effected through the combination of my invention by the provision of a power take-off means 56 transmitting motive power from the source 50 to the fourth shaft means 110. The power take-off means 56 includes a take-off couple 57 on the second gear means 54 whereby power from the source 50 may be transmitted through fifth drive shaft 58, through a third chain drive means 130 to the third drive shaft means 105 from where it will be transmitted by the second chain drive 120 to turn the drive shaft 110 in the second direction and move the weight 40 rearwardly back to its initial starting position. It should be noted that the return drive means 56 does not go through the first or third gear means 28 and 106 respectively so that the rotational speed of the fourth drive shaft 110 will be greatly increased. By this construction the weight 40 may be moved along the guide 30 irrespective of the movement of the weight transfer apparatus 10. Suitable safety means may be provided to insure that during a pull the power return means 56 is disengaged and movement of the weight 40 is possible only through the weight movement drive system 100.

The engagement and disengagement of the various gears in the first gear means 28 may also be advantageously controlled by remote control means conveniently located in the operators cab 60.

It is another advantageous feature of my invention that the weight transfer apparatus 10 may be quickly, simply and securely mounted on the sled 12 by an attachment means 80 which includes an adjustable support 90, a fifth wheel 82, a pair of inclined wedge shaped blocks 84, a kingpin means 86 and a remote controlled lock means 88. The fifth wheel 82, the kingpin means 86 and lock means 88 may be of a design conventional with tractor trailers and thus will be understood by those skilled in the art. The connector means 80 is positioned behind the front wheels 24 and as shown may be very nearly directly below the forwardmost position of the weight 40. A support structure 90 attached below and between the chassis 20 may include rows of holes 92 generally parallel to the chassis 20 and spaced an inch or two apart to allow upward and downward adjustment of the support and the attached chassis 20. This changes the angle of inclination of the guide 30 and while this will have no effect on the movement of the weight it will allow ease in balancing of the apparatus.

The support 90 has a bottom 94 on which the kingpin 86 of suitable configuration is centrally mounted so that it depends downwardly a distance adequate to allow engagement with the fifth wheel means.

It will be understood by those skilled in the art that suitable bearing means 108 and universal joints 109 may be provided where necessary on the drive shafts and gear means of my invention.

To mount the weight transfer apparatus 10 on the sled 12 the second wheel means 24 are driven up an inclined portion 12a of the sled, up along a pair of lifting blocks 84 spaced on opposite sides of the fifth wheel 82 until they pass over an upward forward edge 84a of the lifting block 84. When the second wheel means 24 pass over the edge 84a the kingpin means 86 engages the fifth wheel means 82 and provides the sole connection between the apparatus 10 and the sled 12. At this point the wheel means 24 are suspended in the air above the sled 12 and the ground surface 14. In this position the entire weight of the weight transfer apparatus is applied directly to the fifth wheel 82 and the sled 12.

When it is desired to remove the weight transfer apparatus 10 from the sled 12 the ground engaging first wheel means 22 are driven by the motive power drive system and the remote control lock 88 released so that the kingpin means 86 may move out of the fifth wheel 82. Upon rearward movement of the apparatus 10 the wheel means 24 again moves up and over the edge 84a of the lifting block 84 and rolls down and off the block 84. A chain means 90 connected between the front end of the weight transfer apparatus 10 and the rear end of the sled 12 will allow the weight transfer apparatus 10 moving under the power of the motive system to drag the sled 12 back to the starting position at which point the weight transfer apparatus 10 is again moved onto the sled 12 as heretofore described in preparation for the next pull. It is important to note that by adding to the front end of the weight transfer apparatus 10 the dead weight provided by the motive power means 50, the cab 60 and wheel means 24, for example, the extra dead weight previously required for the sled 12 may be eliminated. Also, this weight is automatically removed after each pull thereby making possible the return movement of the sled by a means of considerably less power than is necessary where a dead weight remains on the sled 12.

From the above noted description of the preferred embodiment of my invention it will be understood that I have provided a new and improved power stopper weight transfer apparatus that is not only very accurate but is simple and convenient to operate. Thus, no extra personnel or equipment is needed to move the weight transfer apparatus between geographically separated meets. The weight transfer apparatus may be driven under its own motive power system 50 over roads and highways just as an ordinary vehicle and loading and unloading of the apparatus together with the necessary time and personnel is eliminated. In addition to these great advantages it is now possible with my invention to also eliminate the equipment and personnel that heretofore have been required to stand-by during a contest to return the power stopper apparatus from its final position to an initial starting position. This is of considerable advantage because the equipment previously required to return the apparatus had to be of considerable power inasmuch as the sled of prior art devices carried a heavy dead weight tractor and thus presented considerable frictional resistance to movement.

With the apparatus of my invention herein disclosed a single operator may perform the same functions in considerably less time than it previously took three or four personnel and two additional pieces of expensive equipment.

Although minor modifications might be suggested by those versed in the art such as for example the provision of equivalent weight movement drive systems or specific equivalent gear means, it should be understood that I wish to embody within the scope of the patent warranted hereon all such modifications as reasonably and properly come within the scope of my contribution to the art as defined by the claims.

I claim as my invention:

1. An apparatus movable over a ground means for measuring or comparing the pulling ability of a tractive power means comprising a frictional resistance means adapted to engage said ground means and a means detachably connected to said frictional resistance means for varying the frictional resistance to movement of the apparatus in relation to the distance through which the apparatus is moved over the ground means, said means for varying the frictional resistance having a first portion and a second portion, said first portion being adapted to engage said ground means and said second portion being removably mounted on said frictional resistance means, said means for varying the frictional resistance including a motive power source whereby said means varying the frictional resistance is self propellable when detached from said frictional resistance means.

2. An apparatus according to claim 1 wherein said frictional resistance means is a sled means having a large flat surface adapted to lie in flat engagement with the ground means.

3. An apparatus according to claim 2 wherein said self propellable means for varying the frictional resistance includes a weight transfer means which increases the weight applied to the sled means to thereby increase its frictional resistance, said self propellable means being removable from said sled to return said apparatus to a starting position.

4. An apparatus according to claim 2 wherein said sled means has a first end and a second end, said first end being adapted to be attached to the tractive power means whose pull is to be measured or compared, and said second end having an attachment means thereon allowing ready attachment and detachment of said self propellable means.

5. An apparatus according to claim 4 wherein said attachment means includes a fifth wheel means on said sled means and a kingpin means connectible between said self propellable means and said fifth wheel, said attachment means further including an inclined wedge-shaped lifting block means positioned so that said self propellable means may be driven thereon to be locked in position on said sled.

6. An apparatus according to claim 4 including a remote controlled detachment means connected with said attachment means for remotely detaching said self propellable means from said sled.

7. An apparatus according to claim 4 wherein said self propellable means includes an operators cab at said second portion over said motive power source, said cab having control means for said motive power source and a means to steer wheel means at said second portion and wherein said motive power source, said wheel means and said cab provide a dead weight acting on said sled.

8. An apparatus according to claim 1 wherein said self propellable means has a first wheel means at said first portion and a second wheel means at said second portion, said second wheel means being supported on said frictional resistance means during movement of said apparatus in a first direction, and said second wheel means being movable off of said frictional resistance means and engaging the ground when said apparatus is moved in a second, generally opposite direction.

9. An apparatus according to claim 8 wherein said first wheel means engage the ground means during all movement of said apparatus, said motive power source being selectively connectible in driving relationship to said first wheel means to propel said carriage under its own power in said second direction.

10. An apparatus according to claim 8 wherein said second wheel means is removably mounted on said frictional resistance means by an attachment means, said attachment means including a fifth wheel means on said frictional resistance means.

11. An apparatus according to claim 8 wherein said second wheel means is steerable through a steering means mounted on said self propellable means, said second wheel means being adapted to be mounted on and over said frictional resistance means, said self propellable means including a frame means, said motive power source being mounted on said frame means in the area of said second portion of said self propellable means; a motive power drive system connecting said motive power source with said first wheel means; said motive power drive system comprising a clutch means allowing engagement and disengagement of said power source with said first wheel means whereby said first wheel means may be disengaged from said power source during movement of said apparatus in said first direction and may be engaged with said power source when said apparatus is moved in said second direction.

12. An apparatus according to claim 11 wherein said self propellable means has a weight means movable between an initial position where its weight is transferred mainly to said first wheel means and a second position where its weight is transferred mainly to said frictional resistance means, a weight movement means disengageably connected to said first wheel means whereby when said apparatus is moved in said first direction said first wheel means moves said weight by means of said weight movement means.

13. An apparatus according to claim 12 wherein said weight movement means includes a differential gear means for conveying rotary movement of said first wheel means to a first drive shaft connecting said differential gear means with a first gear means, said first gear means transmitting said rotary movement to a second drive shaft and through said clutch means to a third gear means, said third gear means providing a rotary movement speed control means, said rotary movement being transmitted from said third gear means through a third drive shaft to a fourth gear drive shaft which rotates to move said weight.

14. An apparatus according to claim 11 wherein said first portion of said self propellable means is a relatively friction free ground engaging means, said self propellable means having a weight means movable from an initial position where its weight is transferred mainly to said relatively friction free ground engaging first portion toward and to a position where its weight is transferred mainly to said frictional resistance means, said movement of said weight means being in direct relation to the movement of said apparatus whereby said frictional resistance to movement of said apparatus varies in relation to the distance through which said apparatus has been moved.

* * * * *